J. GREENWOOD.

MACHINE FOR CROZING AND CHAMFERING BARRELS.

No. 7,093. Reissued May 2, 1876.

Witnesses.
E. D. Scott
P. M. Brandeee

Inventor.
John Greenwood
per R. H. Osgood
Atty.

N. PETERS, PHOTO-LITHOGRAPHER, WASHINGTON, D. C.

UNITED STATES PATENT OFFICE.

JOHN GREENWOOD, OF ROCHESTER, NEW YORK.

IMPROVEMENT IN MACHINES FOR CROZING AND CHAMFERING BARRELS.

Specification forming part of Letters Patent No. 127,478, dated June 4, 1872; reissue No. 7,093, dated May 2, 1876; application filed January 24, 1876.

*To all whom it may concern:*

Be it known that I, JOHN GREENWOOD, of Rochester, in the county of Monroe and State of New York, have invented certain Improvements in Machines for Crozing and Chamfering Barrels, of which the following is a specification:

My invention relates to a machine in which barrels are placed after being set up, for the purpose of forming the croze and chime at the ends of the staves; and it consists more particularly in a pair of revolving barrel-clamps, used in connection with adjustable cutter-heads, and rotary gages or pressure-rollers, which regulate the depth of the cut; and also in certain mechanical means of operating the parts, by which I attain simplicity of construction and convenience in operating.

Figure 1:
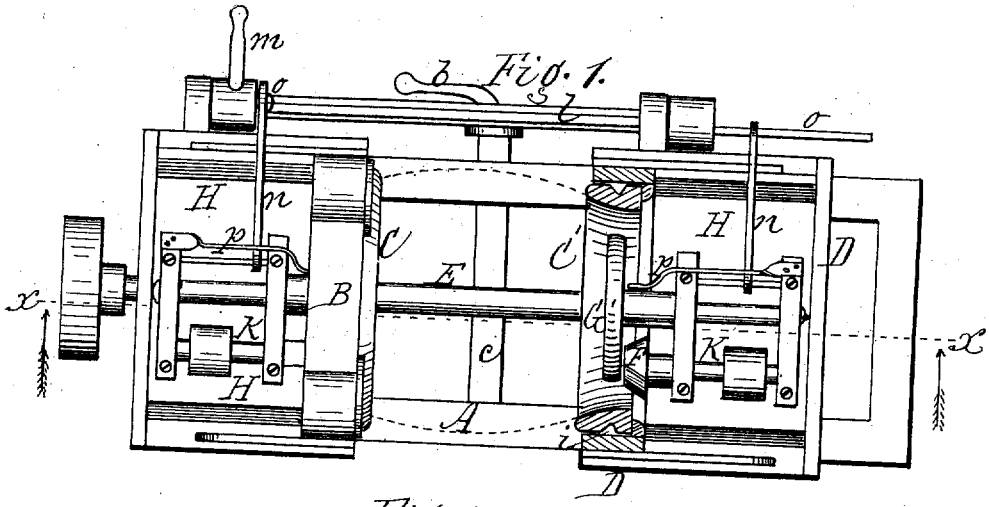
Figure 2:
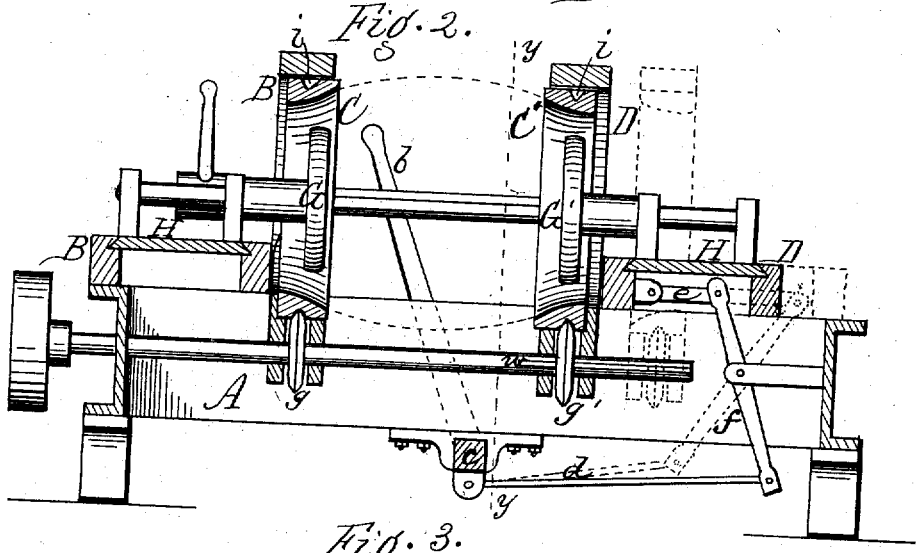
Figure 3:
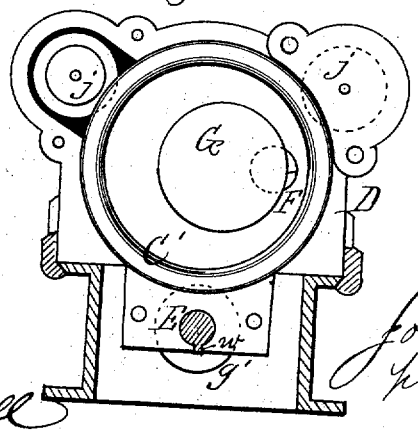

In the drawing, Figure 1 is a sectional plan of my invention. Fig. 2 is a sectional elevation of those parts above the dotted line *x*, Fig. 1. Fig. 3 is a sectional elevation of those parts to the right of the line *y* in Fig. 2.

A represents the bed or frame of my machine, upon which I secure the fixed head-block B, Figs. 1 and 2. This head block supports an internally-conical clamp, C, the diameter of which is such as to receive a barrel and clamp it tightly when forced into it longitudinally, as indicated in dotted lines in Fig. 2. D is a head-block similar to B, but arranged to slide along suitable ways on the bed A. A hand-lever, *b*, and rock-shaft *c*, Fig. 2, control the position of this head-block by means of the connecting-links *d* and *e* and lever *f*, Fig. 2. The head-block D also carries a conical clamp, C′, and said clamps C and C′ are driven by friction-wheels *g* and *g′* upon the shaft E, which are constructed to work in V-shaped grooves *i* in the periphery of the clamps. Supporting-rollers *j*, Fig. 3, are also provided at suitable points upon the heads B D, the peripheries of which run in the grooves *i*. These rollers form bearings for the clamps C C′, preventing any lateral sway of the same, the friction being transferred to the axles of the wheels *g* and rollers *j*. It will be seen, also, that by the arrangement of the friction driving-wheels *g g′* below the clamps the weight of the latter increases the friction upon the periphery of the former, and consequently the driving-power. A spline, *w*, is secured to the shaft E, by which the wheel *g′* is driven at any adjustment of the head-block D upon the frame of the machine. To secure a barrel in the clamps, the operator throws back the head-block D, as indicated in dotted lines in Fig. 2, by means of the hand-lever *b*, places the end of the barrel, which has been partially hooped, in the fixed clamp C, and moves up the head-block D, thus forcing the barrel into the conical clamps, and securely holding it while it is being revolved by them. The cutters which form the croze and chime are secured upon the heads F, Figs. 1 and 3, which are attached to shafts *k*, and driven by any suitable means. One set of cutters are set at an angle to the axis of the shafts *k*, and thus form the chime at the proper inclination with the axis of the barrel, and another set upon the same head are V-shaped and cut the croze to receive the head, as indicated in Fig. 1.

Revolving disk-gages G G′, are also provided, hung upon suitable shafts, parallel with the shafts K, and which are set to run close to the inner end of the cutter-heads F, as shown. The cutters upon the heads F project beyond the periphery of the disk-gages G to form the requisite depth of croze and chime, the gages rolling around upon the inner face of the barrel, as the latter is revolved by the clamps.

The bearings of each set of gage and cutter-head shafts are fixed upon a plate or frame, H, which are adjustable upon the head-blocks B D laterally to the axis of the barrel. Such adjustment is controlled by the operator by means of rock-shaft *l*, lever *m*, and links *n*, the latter pivoted upon rock-arms *o*, secured to the shaft *l*, and suitably connected to the plates H.

When a barrel is being introduced into the machine the cutter-heads and gages are drawn toward the center of the clamps C C′, and after the barrel is secured they are forced outward till the gages come in contact with the staves; the cutter-heads then do their work, the barrel meantime being revolved by the clamps.

It will be observed that if there be any irregularity in the form of the barrel, caused by unevenness or springing of the staves, the axis of the cutters being rigid, the gages press the latter against the concave face of the clamps, which are true circles, and therefore the croze and chime are uniform in depth in all the staves.

It occasionally happens, however, that a thick stave is set up in the barrel; and, for the purpose of allowing this to pass the gages, I provide stiff springs P, Fig. 1, pressing against the gage-shafts, which are susceptible of a slight lateral movement in their bearings. A thick stave will thus push back the gages without disturbing the position of the cutters, the croze and chime being of course uniform, and leaving a uniform thickness of material upon the end of the staves.

It will be observed that, as the head-block D and its attachments are moved forward or backward, the supporting friction-wheel *g'* will be correspondingly moved upon the shaft E, (which is common to both clamps,) being retained against turning upon the shaft by the spline *w*. It is therefore adapted to give motion to the clamp C' at any adjustment. This is essential, not only to keep the clamp and wheel in engagement in moving forward or back to insert or remove the barrel, but also to adapt the machine to barrels of different lengths. The two driving-wheels, *g g'*, will thus drive the two clamps uniformly, without twist or strain upon the barrel at whatever adjustment they may be placed, and by the use of a single shaft, E.

What I claim as my invention is—

1. The disk-gage G, in combination with the cutter-head F and clamp C or C', operating snbstantially as set forth.

2. In combination with the revolving clamp C or C', the friction-wheels *g* and rollers *j* arranged to support said clamps, and one of which constitutes its driver, as and for the purposes set forth.

3. In combination with the disk-gages G G', the springs *p*, arranged to operate substantially as described.

4. The combination, with a revolving clamp, C C', of a supporting wheel or roller, *g*, giving motion to the clamp, and made longitudinally movable upon its shaft or bearing to adapt itself to the different positions of the clamp, as specified.

In testimony whereof I have hereunto set my hand this 21st day of January, 1876.

JOHN GREENWOOD.

In presence of—
R. F. OSGOOD,
E. B. SCOTT.